UNITED STATES PATENT OFFICE.

ORAZIO LUGO, OF JERSEY CITY, NEW JERSEY, ASSIGNOR TO JOHN R. McPHERSON, OF SAME PLACE.

IMPROVEMENT IN FERTILIZERS.

Specification forming part of Letters Patent No. 165,345, dated July 6, 1875; application filed June 26, 1875.

*To all whom it may concern:*

Be it known that I, ORAZIO LUGO, of Jersey City, in the county of Hudson and State of New Jersey, have invented certain new and useful Improvements in the Manufacture of Fertilizers from Blood and other matters; and I do hereby declare that the following is a full, clear, and exact description thereof, which will enable others skilled in the art to which it pertains to make and use the same.

The object of this invention is to prepare blood from slaughter-houses as a material for the manufacture of fertilizers, and for other useful applications in the arts.

Heretofore blood has been coagulated and dried by heat and evaporation, and in that state used in fertilizers. It has also been used to prepare animal albumen by separating the serum from the blood corpuscles.

My invention consists in preparing a dry, friable, and pulverulent mass containing all or nearly all of the nitrogenous parts of the blood without decomposition or loss, and in a state easily preserved.

The means and process for treating blood to remove the water are also much simplified and cheapened by my invention. The product obtained is larger and of better quality.

The first operation in carrying out my invention consists in separating, by means of an agitator, the fibrinous matter from the liquid blood contained in the coagulum or "clots," in the manner more fully hereinafter specified. The second operation consists in treating the defibrinated or disintegrated blood, or blood acted upon by the first operation, with an antiseptic, for the purpose of retarding or preventing the decomposition of the blood; and the third operation consists in eliminating the water or drying the coagulated blood by means of a centrifugal machine.

The different manipulations employed in carrying out my invention are conducted as follows: The blood, as it is collected from the killed animal, quickly passes into a semi-solid state, generally called "clots.". The clots, as well as the liquid blood, are defibrinated or disintegrated, either by agitation or by passing the whole mass between rollers, and placed in a tank or vessel provided with means of heating the contents of said vessel or tank. The tank may have a capacity of ten to twenty barrels, or more. I prefer to fill the tank only two-thirds full of blood, then apply heat, as live steam or otherwise, so that the blood may be boiled and kept boiling for about twenty minutes. After having thus been coagulated or cooked the whole of the albuminous matter is placed in a centrifugal machine, and dried or partially dried, as desired.

The antiseptic that I prefer is a mixture of five (5) parts of stannous protosulphate, five (5) parts water, and five (5) parts methyl alcohol. I use about one (1) fluid ounce of this to every forty (40) gallons of blood. Any other antiseptic suitable for the purpose may be employed instead of this.

I prefer to apply the antiseptic after the operation of separating the fibrine or disintegrating the clots; but it may be applied to the fresh blood. It may also be applied to the finished product.

The object of the operation of defibrination or disintegration is to break up all the cells and separate the fibrine from the other parts of the blood. This operation renders the coagulum in the form of a liquid, with the fibrinous matter suspended in it, which enables me, after boiling liquid, to separate the free water by the centrifugal machine without the necessity of using heat.

In the operation of defibrination or disintegration of the clots the fibrine is separated from the other parts of the blood. If desired for any purpose, the fibrine may be removed; but where this is not desired, it may remain mixed with the other nitrogenous matter.

The resulting product is entirely different from that obtained by removing the water by heat and evaporation. There are no hard lumps. It is a mass of fine grains or powder, easily separated by simply rubbing between the fingers.

I do not claim the separation of fibrine from blood by stirring or agitation, nor the coagulation of the mass by steam or other heat, nor the expelling of water from granular or porous masses of materials by means of a centrifugal machine. Each of these operations has been used separately and in different ways. The combination of these operations constitutes the novelty of my process, and the product having the character named above constitutes the new and useful article of commerce which I have produced. This product may be packed either alone or mixed with other fertilizers, so as to be used as required.

Having thus described my invention, what I claim, and desire to secure by Letters Patent of the United States, is—

1. The process herein described for treating and preparing blood, consisting in breaking it up, coagulating by heat, and removing the free water by centrifugal action, all substantially as described.

2. The new product herein described, consisting of coagulated, granular, pulverulent blood combined with antiseptics, substantially such as described.

In testimony that I claim the foregoing as my own I affix my signature in presence of two witnesses.

ORAZIO LUGO.

Witnesses:
 JOHN R. McPHERSON,
 THOMAS C. CONNOLLY.